United States Patent
Brown et al.

(10) Patent No.: US 7,089,014 B2
(45) Date of Patent: Aug. 8, 2006

(54) WIRELESS COMMUNICATION SYSTEM CONTROL APPARATUS AND METHOD

(75) Inventors: William M. Brown, San Marcos, CA (US); Robert S. Bell, Oceanside, CA (US)

(73) Assignee: Metric Systems Corporation

( * ) Notice: Subject to any disclaimer, the term of this patent is extended or adjusted under 35 U.S.C. 154(b) by 402 days.

(21) Appl. No.: 10/212,972

(22) Filed: Aug. 5, 2002

(65) Prior Publication Data

US 2003/0027577 A1 Feb. 6, 2003

Related U.S. Application Data

(60) Provisional application No. 60/310,746, filed on Aug. 6, 2001.

(51) Int. Cl.
*H04Q 7/20* (2006.01)
*H04B 17/00* (2006.01)

(52) U.S. Cl. .................. 455/450; 455/451; 455/452.1; 455/452.3; 455/464; 455/67.11

(58) Field of Classification Search ............... 455/450, 455/451, 452.1, 452.3, 464, 67.11, 67.13, 455/67.14
See application file for complete search history.

(56) References Cited

U.S. PATENT DOCUMENTS

| | | | |
|---|---|---|---|
| 6,035,048 A * | 3/2000 | Diethorn | 381/94.3 |
| 6,047,175 A * | 4/2000 | Trompower | 455/452.1 |
| 6,097,703 A | 8/2000 | Larsen et al. | |
| 6,327,300 B1 * | 12/2001 | Souissi et al. | 375/219 |
| 6,366,779 B1 | 4/2002 | Bender et al. | |
| 6,400,752 B1 * | 6/2002 | Suzuki et al. | 375/133 |
| 6,545,999 B1 * | 4/2003 | Sugita | 370/347 |
| 6,674,739 B1 * | 1/2004 | Lee et al. | 370/342 |
| 2002/0003792 A1 * | 1/2002 | Schmidl et al. | 370/343 |
| 2002/0080739 A1 * | 6/2002 | Kuwahura | 370/333 |
| 2002/0082032 A1 * | 6/2002 | Hunzinger | 455/510 |
| 2003/0054827 A1 * | 3/2003 | Schmidl et al. | 455/450 |
| 2003/0092442 A1 * | 5/2003 | Dalal et al. | 455/434 |

* cited by examiner

*Primary Examiner*—George Eng
*Assistant Examiner*—Un C. Cho
(74) *Attorney, Agent, or Firm*—Jerry R. Potts

(57) ABSTRACT

According to certain embodiments of the present invention, there is provided a wireless communication system control apparatus and method to determine available wireless communication channels locally and remotely, and for sending a probe signal to a remote wireless communication control apparatus location on a determined available communication channel. A confirmation message is received from the remote wireless communication apparatus location to verify the establishment of the viable communication path.

18 Claims, 5 Drawing Sheets

CONFIGURATION OF DYNAMICALLY ADAPTIVE WIRELESS NETWORK SIMULTANEOUSLY SUPPORTING WAN AND LAN FACILITY FAULTS

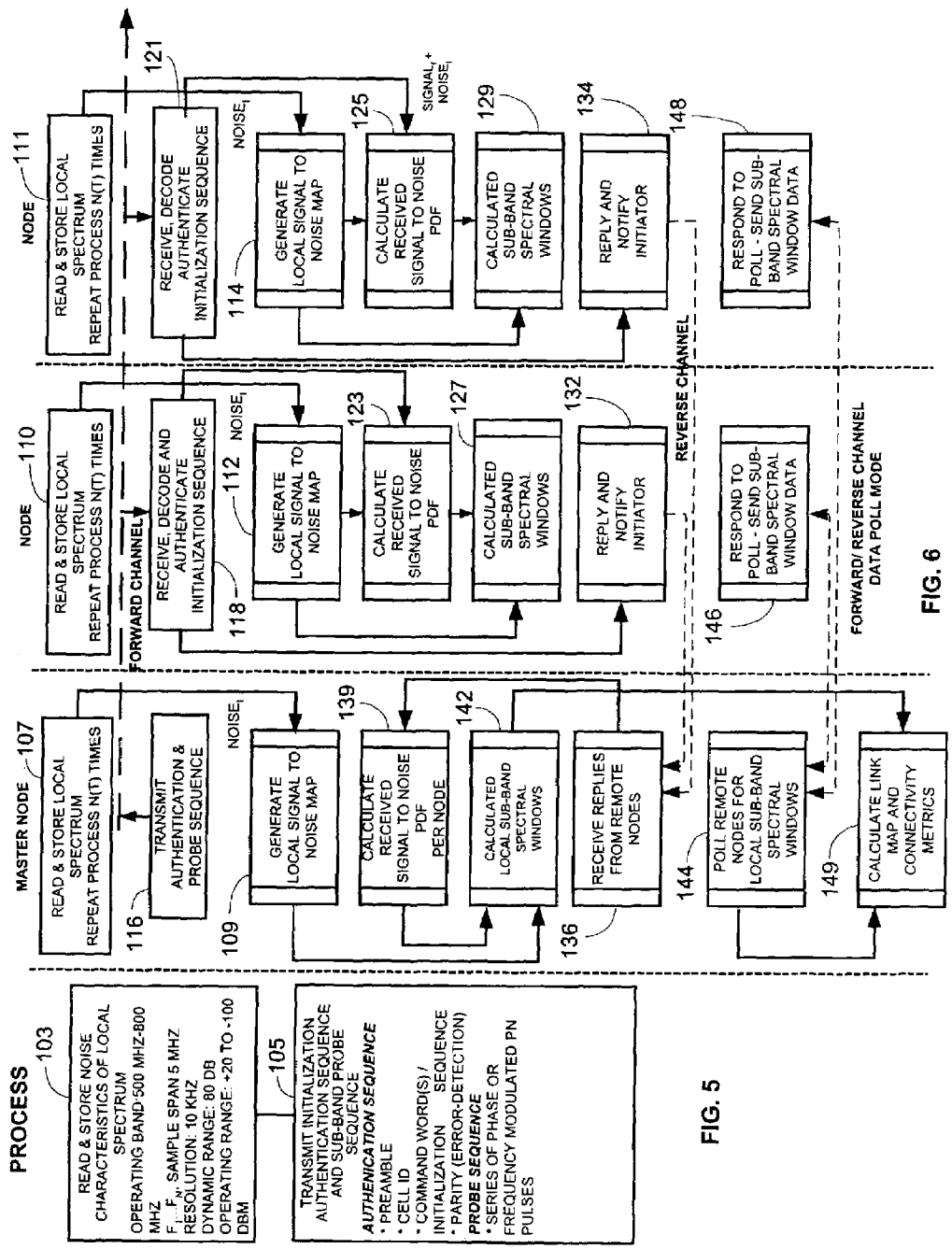

WIRELESS COMMUNICATION SYSTEM CONTROL APPARATUS AND METHOD

RELATED APPLICATION

This application claims priority to U.S. provisional patent application Ser. No. 60/310,746, filed Aug. 6, 2001, entitled "WIRELESS HIGH-CAPACITY FREQUENCY SYSTEM AND METHOD FOR AGILE LAN SYSTEM", which is incorporated herein by reference in its entirety.

STATEMENT REGARDING FEDERALLY SPONSORED RESEARCH OR DEVELOPMENT

This invention was made with Government support under contract number 65540-02-C-0068 entitled "Low Cost Implementation of High Density Wireless Networks" awarded by the Naval Surface Warfare Center. The Government has certain rights in this invention.

BACKGROUND OF THE INVENTION

1. Field of the Invention

The present invention relates in general to a wireless communication system control apparatus and method. The invention more particularly relates to such an apparatus and method which efficiently and effectively establishes desired wireless system communication paths to help alleviate system bandwidth allocation constraints and maintain communications resiliency.

2. Background Art

The background of the invention described in this section is not intended to describe prior art, and no admission is made as to whether or not the background art legally constitutes prior art.

Wireless network systems have been employed for a variety of applications. For example, industrial process control information, and other monitoring systems employing strategically located radio frequency transceivers to provide for a communication network. For example, reference may be made to the following publications, reports, briefings and tutorials for a variety of different wireless techniques, which have been contemplated, and which are incorporated herein by reference as if fully set forth herein:

1) "Clutter Rejection Approaches for Active Sonar Using Coherent, Non-Gaussian Statistics," U.S. Navy Journal of Underwater Acoustics (UNCLASSIFIED), January 1997.
2) "Signal Analysis Applications of Nonlinear Dynamics and Higher Order Statistics," presented at SPIE's 1993 International Symposium on Optics, Imaging, and Instrumentation—Conference 2037 Chaos/Nonlinear Dynamics—Methods and Commercialization, 1116 July 1993, San Diego, Calif., USA [with J. J. Feeney].
3) Network Working Group RFC 1058
4) Routing Information Protocol C. Hedrick June 1988
5) Network Working Group RFC 1131
6) OSPF Version 2 J. Moy July 1991
7) Network Working Group RFC 1349 Type of Service in the Internet Protocol Suite. P. Almquist July 1992
8) Internet Draft, Obsoletes RFC 1075 Distance Vector Multicast Routing Protocol T. Pusateri September 1999 (Expires March 2000)
9) TCP/IP Illustrated, Volume 1 The Protocols W. Richard Stevens Addison-Wesley December 1993
10) CDMA Systems Engineering Handbook Jhong Sam Lee, Leonard E. Miller Artech House Publishers 998
11) OSPF, Anatomy of an Internet Routing Protocol John T. Moy Addison-Wesley, 1998 ISBN: 0-201-63472-4
12) OSPF, Complete Implementation John T. Moy Addison-Wesley, 2001 ISBN: 0-201-30966-1
13) Understanding the Linux Kernel Daniel P. Bovet and Marco Cesati O'Reilly & Associates, 2001 ISBN: 0-596-00002-2
14) LINUX IP Stacks, Commentary Stephan T. Satchell and H. B. J. Clifford The Coriolis Group, 2000 ISBN: 1-57610-470-2
15) "RF Spectrum Monitoring Techniques -EW 101," (Jan. 18, 2000), Cubic Defense, Inc. Proprietary.
16) "MSSI UWB Measurements and Analysis Report", Neptune Sciences, Inc., (August 1998) Raytheon Proprietary, [with Doug Thompson].
17) "UWB RF Pulse Detection in Geolocation Applications," Neptune Sciences, Inc. (Dec. 1, 1998) Raytheon Proprietary.
18) "RF/TOA/TDOA and Clock Synchronization," Neptune Sciences, Inc. (Jan. 28, 1998) Raytheon Proprietary.
19) "Final Phase I Concept Report for the Small Unit Operations (SUO) Situation Awareness System (SAS)," CDS Contract No. MDA972-97-C-0049 for DARPA, (Dec. 17, 1997).
20) "Radio Frequency Propagation Effects in Urban Environments," CDS IRAD Reports #9607 and #9609, Jul. 10, 1997.
21) "Minimum Detectable Signals from UTE Events (U)," SAIC final report prepared under Contract No. N00014
22) 0241 [August 1992 Mod], June 1993 [with J. J. Feeney and R. L. Kelley [SECRET/NOFORN].
23) OFDM for Wireless Multimedia Communications, van Nee, Richard, (British Library Cataloguing in Publication Data) (Artech House universal personal communications)

As a result of the rapidly increasing use of wireless technology, there are fewer and fewer communication channels available. Thus, RF spectrum acquisition is becoming more of a problem for wireless technology applications and subsequent national economic growth.

BRIEF DESCRIPTION OF THE DRAWINGS

In the following embodiments of the invention will be explained in further detail with reference to the drawings, in which:

FIG. 5 is a generalized flow chart diagram illustrating the method of discovery spectral availability according to an example of a method of an embodiment of the present invention;

FIG. 6 is a detailed flow chart diagram of the diagram of FIG. 5; and

DESCRIPTION OF CERTAIN EMBODIMENTS OF THE INVENTION

Figure 1:
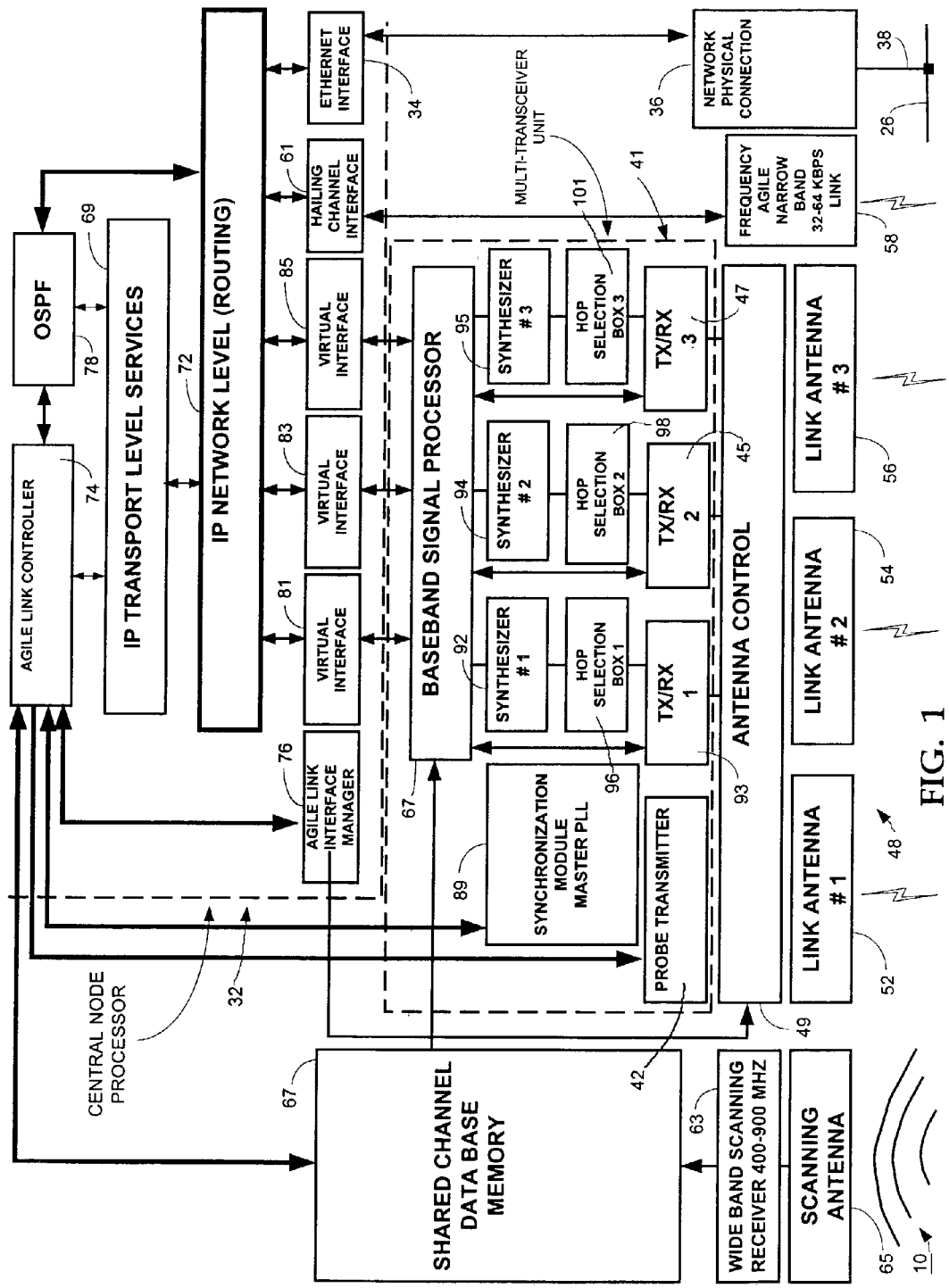
FIG. 1 is a system block diagram of a wireless communication system control apparatus, which is constructed in accordance with one embodiment of the present invention.

According to certain embodiments of the present invention, there is provided a wireless communication system control apparatus and method to determine available wireless communication channels locally and remotely, and for sending a probe to a remote wireless communication control apparatus location on a determined available communication channel. A confirmation message is received from the remote wireless communication apparatus location to verify the establishment of the viable communication path.

The wireless communication system control apparatus may be employed such that a group of two or more such apparatuses form a wireless network of multiple wide-band communication links accordingly to one embodiment of the invention. When deployed, the apparatus or wireless nodes dynamically and adaptively link together to form a wireless networking fabric. The wireless nodes initially find or determine open radio frequency (RF) spectra within a given spectrum range. In the preferred form of the invention, spread spectrum modulation or other such desirable approaches may be employed to efficiently transform this available bandwidth into multiple wireless links.

According to certain embodiments of the present invention, apparatus and methods are provided for enabling spectrum foraging to take place. In this regard, windows of available bands of frequencies are determined locally at a given wireless node. Average local noise level is calculated to determine the signal to noise ratio (SNR) which in turn can be utilized to ascertain the expected bit error rate (BER) for the local environment of the wireless node. In this regard, each node in the network makes such a determination of the local spectral environment and potentially usable RF spectrum.

Thereafter, an inter-node exchange of environmental information takes place. Frequency chirped channel probes are sent from each wireless node to other wireless nodes in the network and within RF visibility to discover channel path characteristics and confirm whether or not communication paths may be validly available. The probes may be modulated to determine fine channel and structure and characterization. Each node sequentially probes and fetches from each other node within RF visibility for a catalog of available frequencies and confirmation of reachable nodes.

The next phase of the operation is to provide physical layer routing to determine possible links via system of discovery and analysis and create a channel catalog database. Thereafter, the network is said to be annealed which means that certain rules are set up for each link which describe a node's fitness and robustness. Node catalog information is exchanged and made available to the nodes of the network. In this manner, each link is then characterized as to its availability to other certain nodes and to what extent a connection can be made between local and remote nodes of the network.

Once catalogs are built and exchanged, routing takes place to establish communication paths extending between various links between nodes of the network by utilizing the rules established to select appropriate links.

This technique as disclosed herein is adaptive and dynamic. In this regard, this technique is updated continuously during the operation of the network either through additional probes or by dynamically measuring and monitoring traffic on each viable RF link.

Figure 2:
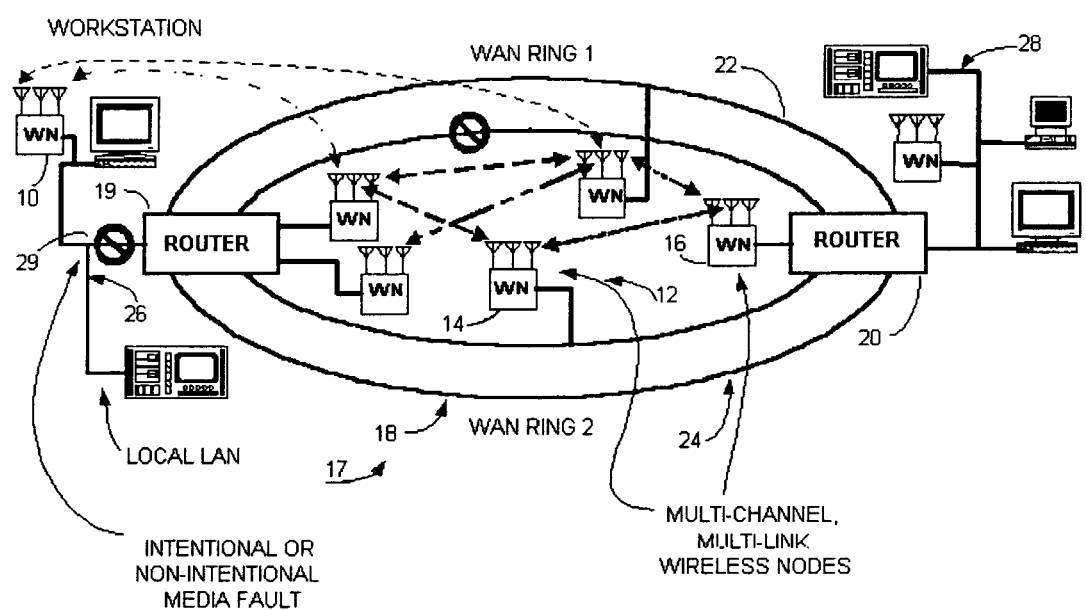
FIG. 2 is a block diagram illustrating a network of like control apparatuses of FIG. 1 used to back up a conventional wide area network (WAN)/local area network (LAN) combined facility.

Referring now to the drawings, and more particularly to FIGS. 1 and 2 thereof, there is shown a wireless communication system control apparatus or wireless node 10, which is constructed in accordance with an embodiment of the present invention. The wireless node 10 may be employed as part of a dynamically adaptive wireless network as generally indicated at 12 in FIG. 2 by being connected in wireless communication with a group of other strategically located like wireless nodes such as nodes 14 and 16. As shown in FIG. 2, the wireless network 12 is used to back up a conventional enterprise or shipboard communication system 17 which includes a wide area network (18) having routers 19 and 20 for wide area network rings 22 and 24, together with local area networks 26 and 28. The purpose of the back up wireless network 12 is to facilitate communication if one or more media faults such as a media fault 29 occurs in either the local area network or the wide area network.

While the preferred form of the invention as disclosed herein relates to a wireless network serving to back up a shipboard communication system, it is to be clearly understood that the present invention is not limited to such an application. Additionally, it is to be understood that the wireless communication system control apparatus may be employed in applications other than multiple-node wireless networks, such other examples may include other wireless devices such as terrestrial microwave, satellite and wireless local area networks and wireless personal digital assistants.

Referring now to FIG. 1, the wireless node 10 will now be considered in greater detail. The wireless node 10 generally comprises a central node processor 32 which communicates via an ethernet interface 34 through a network physical connection unit 36 and a cable 38 to the local area network 26 of the communication system 17 of FIG. 2. It should be noted that the wireless node 10 may be connected to other portions of the shipboard communication system 17 as described herein.

A multiple transceiver unit 41 includes a probe transmitter 42 used to send probe messages to other like probes in the network 12. Unit 41 includes a set of three independently controlled half or full duplex link transmitter/receivers 43, 45 and 47 to facilitate communication with other nodes of the network 12. It is understood that either a larger or smaller number of such transmitter/receivers may be employed, but for the disclosed embodiment of the present invention, three is preferred. An antenna subsystem generally indicated at 48 communicates with the probe transmitter 42 and the three link transmitter/receivers 43, 45 and 47.

The antenna subsystem 48 includes an antenna control 49 and three link antennas 52, 54 and 56.

A probe data link 58 is connected to a hailing channel interface 61 of the central node processor 32. The link 58 is a frequency agile narrow band link, which in this embodiment is the 32–64 KBPS band for the transmission and receipt of information from other wireless nodes.

A wide band scanning receiver 63 is fed by a scanning antenna 65 and operates in the disclosed embodiment 400–900 MHz band for providing local information regarding available channels for storage in a shared channel database memory 67. The memory also stores the catalog of information regarding the links of the wireless network 12.

The central node processor 32 employs and executes a variety of software. An IP transport level services software stack 69 and an IP transport level services software stack 72 are stored and executed in the processor 32. An agile link controller 74, as hereinafter described in greater detail, communicates with the probe transmitter 42 to generate and send the probes. It also communicates with the multi-transceiver unit 41 as illustrated, together with storing the catalog information in the shared channel database memory 67. An agile link interface manager 76 also communicates with the agile link controller 74 as hereinafter described in greater detail. An Open Shortest Path First (OSPF) routing algorithm unit 78 is controlled by the IP network level routing software 72, and communicates with the agile link controller 74 to facilitate efficient communication path selection. The selection process relates to various costs, including time, money, data rate, and quality of service.

A set of three virtual interfaces 81, 83 and 85 enable the central node processor 32 to communicate with a baseband signal processor 87 of the multi-transceiver unit 41. The unit 41 also includes a synchronization module master phased lock loop 89, which communicates with the agile link controller 74. A set of three synchronizers 92, 94 and 95 together with a set of three hop selection boxes 96, 98 and 101, form a spread spectrum modulator. It should be understood that other types and kinds of modulators and other techniques may be employed to assist in the frequency foraging operation.

The wireless node 10 looks for available bandwidth on a continuous basis.

In the discovery phase of the search for available bandwidth, if sufficient signal level above the average noise is available, then it is determined that the signal-to-noise ratio is sufficient for an adequate BER. All of the wireless nodes of the network probe one another to gather information to determine the physical layer of the network at any given period of time. Thereafter, the wireless physical links are determined to create the catalog for storage in the memory 67.

The catalog information is exchanged, since the preferred form of the inventive system is a quality-of-service based system for ascertaining the desired communication path at any given time.

The apparatus and method of the disclosed embodiments of the present invention facilitate traffic augmentation in wireless communication systems to facilitate restricted bandwidth problems by providing more viable wireless communication paths. Such a disclosed apparatus and method may be a fixed or portable, as well as mobile, systems.

Spectral Discovery Process

Referring now to FIG. 5, as indicated in box 103, the spectral discovery process is the process whereby available frequency bands are discovered for each wireless node. As indicated in box 103, each wireless node, such as the node 10, reads and stores noise characteristics of the local spectral environment. In the example disclosed herein, the operating band is in the area of 500 MHz to 800 MHz. However, it will be understood by those skilled in the art that other operating bands may also be employed.

As indicated in box 103, the sample spans 5 MHz with a resolution of 10 KHZ with a dynamic range of 120 dB through an operating range of +20 to −100 dBm.

As indicated in box 105, the initialization authentication sequence and sub-band probe sequence is transmitted to all of the other remote wireless nodes. The authentication sequence includes the preamble, cell identification and the command word or words for sequence synchronization. Also includes are parity information for the purpose of error detection. The probe sequence includes a series of phase or frequency modulated Pseudo Noise (PN) pulses.

Considering now the discovery process in greater detail with reference to FIG. 6, a master node such as the master node 10 receives and stores local spectrum information and generates local signal to noise map information as indicated in box 109. This operation is continuously undertaken by the master node 10, as well as all of the other wireless nodes such as the wireless nodes 14 and 16 as indicated at box 110 and 111 respectively. The other remote nodes also generate local signal to noise maps as indicated at boxes 112 and 114 for the remote wireless nodes 14 and 16.

The master wireless node such as the master wireless node 10 transmits authentication and probe sequences to each one of the other remote wireless nodes as indicated at box 116 in the forward direction using available frequency bands as discovered as a result of the reading and storing the local spectrum information. The remote wireless nodes such as the nodes 14 and 16 receive, decode, and authenticate the initialization sequences received from the master node 10 as indicated at boxes 118 and 121 respectively. As indicated at boxes 123 and 125, the nodes such as the nodes 14 and 16 calculate the received signal to noise PDF. As indicated at boxes 127 and 129 for the remote wireless nodes such as the nodes 14 and 16, the signal to noise Power Density Function (PDF) is utilized to calculate sub-band spectral windows for the master node 10, as well as the local signal to noise map information received from the respective boxes 112 and 114.

As indicated in boxes 132 and 134, the remote nodes such as the nodes 14 and 16 reply and notify the master node 10 after receiving, decoding and authenticating the initialization sequence. In this regard, the remote nodes all reply to the master node 10 in a reverse channel direction so that the master node 10, as indicated at box 136, receives the replies. Upon such receipt of the replies, as indicated in box 139, the master node 10 calculates the received signal to noise PDF per each node. As indicated at box 142, the master node 10 calculates the local sub-band spectral windows based upon the generated local signal to noise map (box 109), as well as the calculated received signal to noise PDF for each node.

As indicated in box 144, the master node 10 poles remote nodes for the local sub-band spectral windows by communicating with the remote nodes such as the nodes 14 and 16. As indicated in boxes 146 and 148, the remote nodes respond to the poles and send sub-band spectral window data back to the master node 10 so that the master node 10 is then able to determine the available spectral windows for each node. As indicated at box 149, the master node 10 calculates the link map and connectivity metrics based upon the calculated local sub-band spectral windows (box 142), as well as the sub-band spectral window data received from the remote nodes. In this regard, the available window data for each node enables the master node 10 to calculate the availability of various links throughout the network.

It is to be understood that while a master node is employed in the disclosed embodiment of the present invention, it will become apparent to those skilled in the art that principles on the present invention may employ networks or other systems where master nodes are not employed.

Scanning Process

Figure 7:
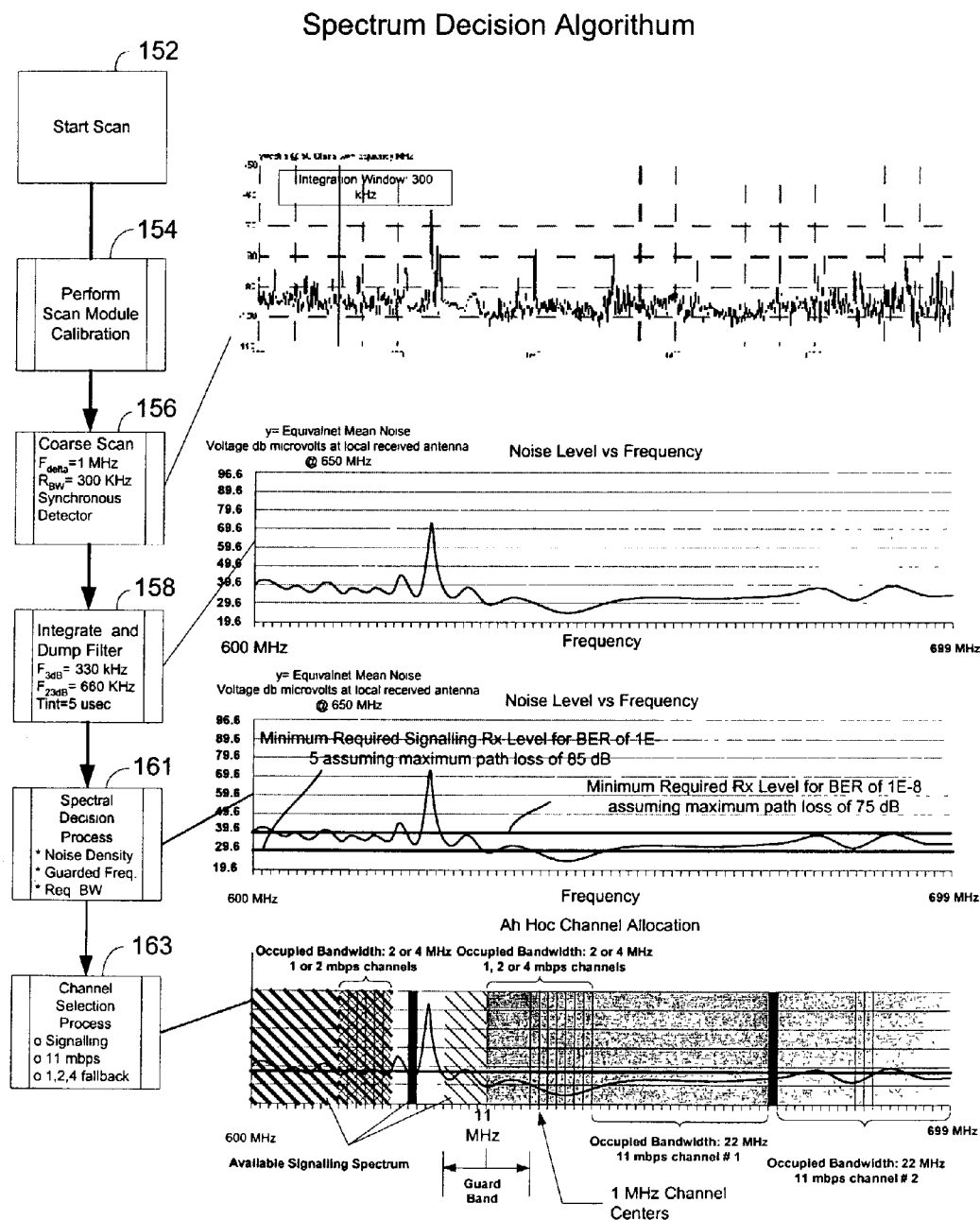
FIG. 7 is a flow chart diagram of a scanning method according to an embodiment of the invention.

Referring now to FIG. 7, there is shown the scanning process method according to the disclosed embodiment of the present invention. The scanning process is started at box 152 and transitions to box 154 to perform the scan module calibration procedure to initialize the sequence of operations. Thereafter, at box 156, the spectral environment is coursely scanned and as indicated in the associated graph, an integration window of 300 KHZ as indicated at box 158, an integration and dump filter is executed as indicated by the associated graph illustrating an example of a noise level vs. frequency distribution between 600 MHz and 699 MHz.

As indicated in box 161, a spectral decision process is then undertaken to determine the noise density, guarded frequencies and bandwidth. As indicated in the associated noise level vs. frequency graph, the minimum required signaling received level for the BER of 1E5, assuming a maximum path loss of 85 DB. Above that level is a minimum required receiver level of BER of 1E-8 assuming a maximum path loss of 75 DB.

At box 163, a channel selection process is executed. As indicated in the associated graph of noise level vs. frequency, the available signaling spectrum is determined, together with a guard band of 11 MHz, the remaining bandwidth being occupied.

As a result of this scanning operation, efficient modulation is achieved for a broad modulation bandwidth for continuous transmission. The operation is quickly synchronized, and low power spectral density minimizes or greatly reduces interference.

Shipboard Wireless LAN System Example

As shown in FIGS. 1 and 2, the disclosed embodiment of the invention may be used in one example as a high-capacity frequency agile shipboard wireless LAN system 17. The system is intended to provide uninterrupted network connectivity in the event that a primary or secondary hard wired WAN and/or LAN transportation systems are compromised. The system 17 is a hybrid wireless LAN node capable of concurrently establishing and managing three independent high bit rate (5–15 Mbps) full duplex IP base wireless links in a dense shipboard RF environment. Fundamental to successful implementation is the ability to search and find moderately wide and relatively free spectral transmission and transmission windows over a wide controlled bandwidth. Utilizing discovery and classification algorithms together with fourth generation Commercial-Off-The-Shelf (COTS) wireless LAN integrated circuit technology, the system 17 may be able to provide sub-second alternative backup service to a wide range of CAI and HM&E systems. Ongoing inter-compartment and inter-deck path measurements exercises may be extended to additional vessel classes. On-air system verification for certain applications may include installing and independently testing, for example, 10 to 15 wireless LAN nodes in a variety of nominal and fault induced operational scenarios.

As an example, integrated wide area networks (WAN) and local area networks (LAN) are becoming an integral internal communications component of military combatant sea-going vessels. Such networks are critical to the proper operation of such vessels. The loss of network connectivity could have a severe adverse affect on mission effectiveness and vessel viability. Recognizing the benefit of a reliable backup connectivity system, the system 17 is a high-capacity, low-power, frequency agile wireless LAN nodes to provide high-speed adjunct and backup connectivity in the event core network transport facilities are damaged or lost.

In the example illustrated in FIG. 1, multiple wide-band communication links can be concurrently established, on demand, in a RF rich environment using the minimum of RF power. When deployed, these multiple wireless LAN nodes such as the wireless nodes 10, 14 and 16, would dynamically and adaptively link together to form a wireless networking fabric capable of sustaining network connectivity in the face of multiple WAN and LAN connectivity failures.

As illustrated in FIG. 2, prioritized seamless high capacity network connectivity beyond what is supported by current WAN/LAN redundancy practices may well be achieved for same applications.

Figure 3:
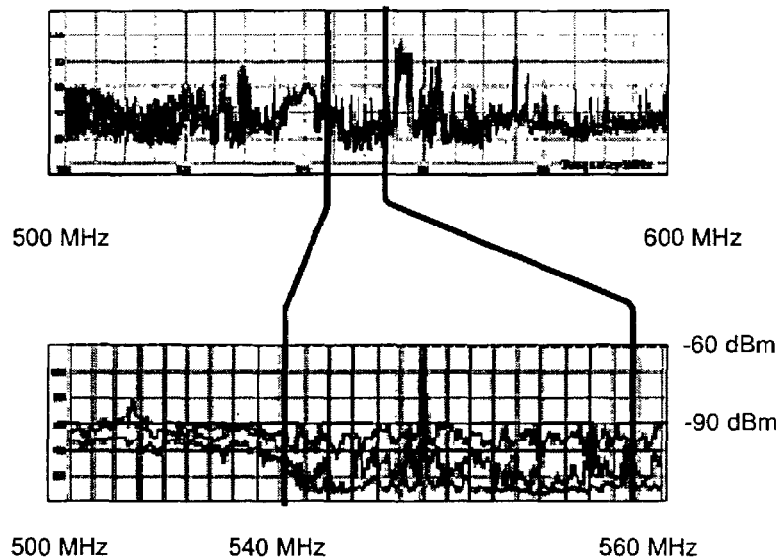
FIG. 3 is a graph including an enlarged scale magnified portion thereof, useful in understanding the disclosed embodiment of the present invention.

The wireless nodes, such as the node 10, initially find or determine open RF spectra within the spectrum range, for example, of 400–900 MHz that through spread spectrum modulation or other desired approaches, and current digital signal processing techniques, can transform this available bandwidth into multiple high bit rate links. A graphic example of this concept is shown in FIG. 3.

Using a test transmitter of +10 dBm @ 543 MHz driving a quarter-wave monopole a received signal with approximately −30 dBm to −35 dBm was measured approximately 75 feet from the pilot transmitter.

In this example, measurements were made using orthogonal frequency division multiplexing modulation (OFDM) a 20 Mbps throughput is achievable within an 158 MHz bandwidth.

The system and method of the disclosed embodiments relate to an internal multi-link wireless LAN system capable of supporting aggregate rates of 50 to 100 Mbps with individual links supporting 10–100 Mbps. The disclosed system 17:

1) measures shipboard EMI and Path Loss;
2) implements a low-cost wide-band spectral window classifier;
3) implements a high-capacity multi-link COTS Base WLAN Tx/Rx Platform based on IEEE 802.11 Technology; and
4) employs ten (10) prototype frequency agile wireless LAN units for the preferred embodiment of the invention.

Referring to FIG. 3, initial test results indicate wireless nodes such as the wireless nodes 10, 14 and 16, placed within 50–100 feet of each other can create a far-end received signal-to-noise (SNR) ratio of 25–40 dB. This objective can be achieved in using a relatively low power (+10 to +20 dBm) emitter operating in the 500–1200 MHz range. Using relatively simple complex modulation schemes sustainable simplex thruputs of 2 to 5 Mpbs or greater per link are achievable. A six link (three independent Tx/Rx) Per node system, may provide an aggregate capacity between 12 to 30 Mbps per node.

The system 17 provides a shipboard wireless coverage tool which can be used to measure local EMI and propagation loss. This tool may also be used for the shipboard placement and installation of wireless LAN nodes.

The spectral estimation subsystem may have the responsibility of seeking out and qualifying candidate spectral windows such as in the 500–900 Mhz band. This subsystem component may be based on an original equipment manufacturing (OEM) version of the computer controlled scanning receiver.

The system 17 provides a Multi-link Tx/Rx spread spectrum system using the most contemporary IEEE 802.1ab embedded (system on a chip) COTS wireless technology. According to the disclosed embodiment of the present invention, three independent high-capacity (10–53 Mpbs) RF links may be integrated into a single package. However, it is to be understood that such RF links may not be so integrated for some applications, and there may be more or less than three being employed.

The channel probe process subsystem constructed and tested validates that found bandwidth holes are reachable from far-end candidate spectral windows.

The system 17 may be a low-cost multi-antenna subsystem which includes wire nodes such as the wireless node 10 which includes a node control processor 32, a broadband scanning antenna 65 for spectral searches, and three unity gain monopole link antennas 52, 54 and 56, each with an independent polarizer.

The central node base band processor 32 is responsible for controlling total system communications management. This processor performs the following functions: manages the scanning receiver sub-processor; analyzes scanning receiver data to classify candidate spectral windows; exchanges and manages the channel verification probe process; spectral windowing information with other nodes—via ethernet or other trusted back channel links; configures and controls the internal multi-channel frequency synthesizers 92, 94 and 95 for control of each Tx/Rx units 43, 45 and 47; and provides interface and priority interface protocol and link support to the network layer/module.

The system 17 may include a shipboard path loss software prediction tool. This feature may be related to an EMI/path loss tool, which may also be provided. This may be a Windows 98/NT based application-tool which enables RF designers to predict shipboard performance of a wireless LAN system. The system 17 may enable the user to probe noncontiguous spectra.

Figure 4:
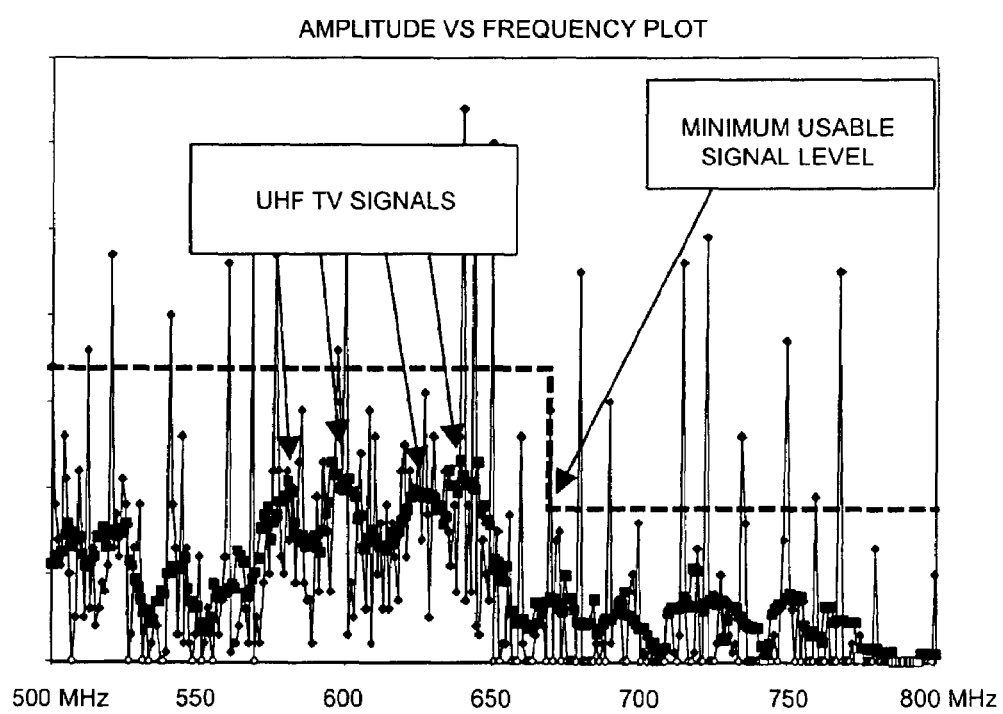
FIG. 4 is a graph which is also useful in understanding the disclosed embodiment of the present invention.

Referring to FIGS. 1 and 4, the system 17 may scan the target bands of interest, such as the 400–900 MHz band. A wide band COTS's computer controlled digital scanning receiver feeds from a dual polarity monopole antenna 63 which is incrementally stepped across a given band segment. At each step (step size is controllable from 1 KHz to 100 MHz), the instantaneous noise voltage of a computer controlled analog filter (1 KHz to 250 KHz) is digitized.

Successive scans allow each node to build up a collection of scan histories, which through algorithmic processing, permits a forecast of possible spectral windows with an appropriate background noise level sufficient for a high capacity link. For example, FIG. 4 shows the RF noise spectra for an actual installation. The mean noise level from approximately 600 MHz to 800 MHz is approximately –105 dBm measured in 1 MHz steps in a 25 KHz bandwidth. From path loss measurements and presented in FIG. 3, the mean path loss at 700 MHz between these two compartments is 60 dB, assuming a +10 dBm Tx output power level and 5 dB coupling loss on the Tx and Rx antenna ends respectively. With this example, an input SNR of 45 dB is achievable. Using the Cramer-Rao bound of roughly 0.7–1.6 dB SNR requirement for each Bit/Sec/Hz transmitted, this channel would have the capacity to support approximately 10 Bits/Sec/Hz or for a 25 KHz channel a channel capacity of 250 Kbps. In reality, assume a thruput rate of 50 Kbps per Hop and 2000 Hop channels (over a 100 MHz bandwidth). This yields a potential thruput of 56 Mbps assuming a 25% loss of Hop channels and 25% of packet overhead per second.

As shown in FIG. 1, the wireless node 10 includes a multi-link Tx/Rx spread spectrum multi-transceiver unit 41. An example of such a unit may be fourth generation system-on-chip (SOC) wireless LAN chip sets. Originally designed for the 2.4 GHz and 5.8 GHz 802.11 IEEE wireless LAN standard, these chips with the appropriate frequency translators and synthesizer subsystems may be designed to operate in the 400–900 MHz band. The Raytheon RTCV-5500 series may be employed. This series includes a frequency converter LNA PA switch module and the RTB-5500 base band module.

The wireless node 10 performs a channel probe operation. Discovering a near-end clear channel is only part of the solution. A near-by clear channel does not necessarily indicate transparency. To project nodes, the wireless node 10 verifies that a channel can be used as a reliable transmission path. To reach adjacent nodes, each node incorporates a frequency agile CW probe. Following the exchange of possible spectral windows each node initiates a synchronous transmit and track algorithm. The objective of this process is to verify RF transparency or detect RF opacity. Data gathered in this process is used to establish operating bandwidth, Tx/Rx parameters, and confirm link status.

It may be that more spectral windows are discovered than can be supported by the three local Tx/Rx units. In such a circumstance, surplus secondary channel links may be held in reserve and used when a primary link or links fail or re-routing is necessary due to loss of adjacent links.

The launching and retrieving of low power, wide bandwidth wireless LAN energy is accomplished by the antenna subsystem 48. The antenna subsystem 48 includes an antenna control 49 and three antennas 52, 54 and 58. The wide band antenna is in essence two calibrated orthogonal monopoles. Through a processor controlled polarizer, the scanning receiver will be able to scan the bands of interest in the vertical and horizontal planes, providing the Tx/Rx link antennas polarization guidance.

For the shipboard example of FIG. 2, each antenna is connected to the main LAN unit by an armored cable. The transmit/receive polarity of each antenna is independently controllable.

The baseband central node processors 32 is a node base band processor subsystem, which may be a collection of three 32 bit low-cost Intel 386EX industrial embedded processors.

The processor 32 may execute programs for the following node tasks
1) SCAN receiver control
2) spectral window analysis
3) channel verification (probe) process
4) Tx/Rx control—all three full duplex links
5) Interface control to the network layer Within a defined area, a band of spectrum can be sampled (scanned) with sufficient resolution and with sufficient frequency to find and characterize appropriate spectral windows. On-start-up, a back channel communication network (or channels) exist to allow the exchange of spectral windowing data between multiple wireless nodes. An embedded communications analysis program defines communication parameters such as: modulation characteristics, transmission power level. A "feedback" or sampling system continuously monitors the quality of payload data. This information is used to maintain link quality.

As to the system and method of certain embodiments of the present invention, there are at least two major applications: a system tool used in enhancing the cooperative use of the RF spectrum, and enabling a higher density of users within geographical and spectral area. As the infrastructure governing the RF spectrum for a given country undertakes remediation and expansion, a remote high-speed digital service demands a larger share of the RF spectrum. The system and method of certain embodiments of the present invention can contribute a significant portion of the additional bandwidth required.

One use contemplated by certain examples of the present invention could be the maximizing or at least improving the spectrum utilization in non-cooperative, non-jamming, controlled environment such as a naval vessel or other applications. A wireless backup communication system using examples of the invention could dynamically and adaptively conform to the local RF environment providing sufficient bandwidth to meet an application's specific requirement at the time.

Another non-conventional use of examples of certain embodiments of the invention is to consider the advantage for a team of public safety communications personnel to have equipment which is capable of dynamically, and in real-time securing bandwidth as required—rather than rely upon fixed band/low bandwidth systems.

Currently, shipboard communications become simultaneously vital and potentially unreliable during combat. One major cause of the unreliability of communications is the physical destruction of the communications media (e.g., copper wires and glass fibers.) Wireless communications offers a solution to the problem of media disruption, but suffers from a different set of problems. Some of these problems are due to the nature of the physical environment (e.g., metal walls, floors, and ceilings.) Others are due to nature of the electromagnetic environment (e.g., generators, motors, radars, and other wireless communication equipment.) Yet others are due to the nature of combat (e.g., deliberate hostile jamming, friendly jamming of the enemy's communications, destruction of transceivers.)

The solution to these problems according to an embodiment of the invention for wireless communications resembles the solution used in the wired communications. In this regard, there may be provided redundant communications channels, each of which is affected by a different set of problems than the others. Wireless communications offer many different channel types to help provide the diverse redundancy required. Among these are frequency diversity, bandwidth diversity (e.g., high-energy narrow band, low energy broadband, modulation diversity, coding diversity, etc.).

There are a number of problems in wireless shipboard communications that must be addressed. A way should be provided to quickly heal network disconnections due to damaged network nodes. Current route discovery algorithms can heal the network, but the required amount of redundant equipment may be excessive for certain applications. The node 10 may provide an agile channel radio to enable redundancy without adding to the equipment.

Choosing the appropriate route for the type of data is another problem. Currently, link state router and route discovery algorithms such as OSPF provide this function, if the applications take advantage of the type of service attribute of IP packets. OSPF, however, uses fixed parameters for the channels and is inappropriate for an agile channel radio.

It is important for some applications to ensure that vital data is transmitted and received, even if it means delaying or dropping other data. Currently, each channel, whether wire or wireless, has a fixed mode of operation which governs its speed and reliability. An agile channel radio may offer variation not only of frequency and bandwidth, but also of coding techniques to increase processing gain and thus increase channel reliability at the expense of channel speed, as well as the use of parallel channels to increase link speed.

The wireless node 10 may provide priority message delivery, and IP precedence bits and priority delivery within for example.

The system 17 may create an internal multi-link wireless network capable of finding optimum or at least highly desirable routes for both the current capabilities of the links and the type of traffic. The network may also perform priority delivery to ensure that urgent messages arrive before non-urgent messages.

The disclosed embodiments of the invention may control a network in such a way to find the best routes for packets travelling over links with changing properties. The best route for a given packet may be determined not only by the most recently measured state of the links, but also on the type of service requested by the packet.

The system and method disclosed herein creates a network that ensures that packets that are "urgent" may have delivery priority over those that are not. The delivery priority algorithms may be complemented with priority triage so that high priority messages are less likely to be discarded by an overloaded network. The priority delivery features are not intended as an invitation to reduce the normal capacity of the network, but as a feature to help speed delivery in a normally operating network and to ensure that the most important messages are delivered rather than being deleted in an overloaded, damaged network.

For certain applications, a wireless backup network may not have as high a bandwidth as the wire or fiber that has been damaged. Therefore, there may be some triage of messages within a damaged network to insure that important messages are delivered. IP has defined a three bit field "Precedence" within the same byte as the "Type Of Service" field in order to give some messages priority over others. This field allows eight levels of precedence, and the meanings of the eight levels may be defined for certain applications. The various socket interfaces do not allow setting of this field. A Request For Comments document (RFC) must be generated defining this field in such a manner that it useful for military and public safety communications within a degraded network. At the same time the needs of national infrastructural communication networks must be taken into consideration. These two needs will likely be much the same. Additionally there may be the need of the network itself to deliver internal messages with some priority in order to maintain network integrity. However strong rules must be established so that Precedence values do not spread beyond the network area where they are needed. For example, Boarder Gateway Routers may be required to reset the Precedence field of a packet to "Normal" before routing it.

A damaged network operating using wireless backup routers may have a set of links with vastly different and changing properties in terms of bandwidth, and error rates. This state is in great contrast to the normal network where the LAN has uniform and stable properties for all routes. This may require routes to be chosen to optimize performance in several different ways (e.g., Maximize Reliability may choose a different route than Minimize Delay.) OSPF has defined (but almost never implements) Type Of Service routing to solve this problem.

OSPF currently may restrict a routing cost to be an unsigned sixteen bit integer. Routes are chosen so that the sum of this integer over all segments of the route is a minimum. The resolution offered by a sixteen bit value may be sufficient to make realistic choices between different routes. However the choice of using the arithmetic of unsigned integers unduly restricts the usefulness of the metric. Indeed this restriction is one of the reasons that Type Of Service (TOS) routing is rarely implemented. For instance the Type Of Service "Maximize Reliability" demands probabilistic calculations rather than sums and needs to choose a maximum rather than a minimum. To a large extent this problem may be solved by defining alternative mathematics for some of the types of service. For example, the Maximize Reliability metric could be represented by a negative constant times the logarithm of one minus the bit error rate of channel (the bit error rate, or an analog, is reported by some communications equipment) and the comparison operator could report the value that maximizes the sum of these logs as the minimum. In the disclosed embodiment, the power of abstract classes in C++ makes this definition of new arithmetic operators fairly simple.

The Linux sockets interface for Internet communications may not support convenient setting of values for Type Of Service and Precedence. However, the entire packet can be modified using the IOCTL interface. A Programmers Interface which allows easily understood setting of these values must be provided. There are many implementations of sockets using many computer languages.

The open systems OSPF code may be changed to use an C++ abstract class instead of an unsigned sixteen bit value for the cost (metric) of a link. From the abstract class, derive one instantiable class for each defined type of service. In these classes define the mathematics of the sum and comparison operators to perform the correct arithmetic for corresponding type of service.

In order to "Minimize Delay," the length of time a message spends in the channel may be determined. A high bandwidth satellite link could have high throughput but also high delay by carrying many messages in the channel at once (this situation is referred to as a long fat pipe.)

The open systems OSPF simulator (ospf_sim) may be modified to allow dynamic changes to the channel characteristics and to record all packet activity. This simulator uses the actual OSPF code so it can be used to test the behavior of the code in situations that are difficult to set up in real networks. The testing would be to simulate a network with a high bandwidth LAN and a series of lower bandwidth routers with dynamic channel characteristics. The simulation could cause the LAN to break and the backup routers to assume routing responsibility. Testing would determine the stability conditions of the backup network, the priority triage of messages and the distinction between routes taken for different types of service.

The routing function is a part of the Linux kernel for the central node processor 32. Since the Open Systems Linux kernel may not provide satisfactory performance in real-time for some applications, a "Real-Time Linux" may be used. Routing functions may be altered to provide the desired priority routing behavior.

While particular embodiments of the present invention have been disclosed, it is to be understood that various different modifications and combinations are possible and are contemplated within the true spirit and scope of the appended claims. There is no intention, therefore, of limitations to the exact abstract and disclosure herein presented.

What is claimed is:

1. In an undefined radio freguency environment having a plurality of wireless communication control apparatus disposed randomly at individual locations, wherein none of the individual ones of the apparatus are in communication with any other individual ones of the apparatus, each individual one of the plurality of wireless communication control apparatus, comprising:
    means for dynamically and adaptively establishing a communication channel with other individual ones of the wireless communication control apparatus within radio frequency visibility to facilitate forming a defined wireless network with the plurality of wireless communication control apparatus in the undefined radio frequency environment:
        wherein said means for dynamically and adaptively establishing a communication channel with other individual ones of said apparatus includes:
        means for discovering open radio frequency spectra within a given spectra range; and
        means for transforming discovered open radio freguency spectra within the given spectra range into a plurality of wireless communication links between the control apparatus disposed randomly at individual locations;
        wherein said means for discovering open radio frequency spectra includes;
        means for enabling local spectrum foraging;
        wherein said means for enabling local spectrum foraging includes:
        means for calculating an average local noise level;
        means for using said average local noise level to determine a signal to noise ratio; and
        means for using said signal to noise ratio to determine an expected bit rate error for the local environment of the wireless apparatus;
        means for calculating channel statistics and dynamic parameters including at least propagation delay and transport time; and
        wherein said means for transforming discovered open radio frequency spectra within the given spectra range into a plurality of wireless communication links between the control apparatus disposed randomly at individual locations includes:
        means for performing an inter-node exchange between individual ones of said plurality of apparatus of their determined expected bit rate error for their local environment; and
        means for using exchanged expected bit rate errors to confirm whether a communication path may be validly available between individual ones of said plurality of communication control apparatus.

2. The wireless communication control apparatus according to claim 1, wherein said means for performing an inter-node exchange includes:
    means for sending wirelessly a frequency chirped channel probe to other individual ones of said apparatus within radio frequency visibility of said probe; and
    means for receiving wirelessly a frequency chimed channel probe transmitted from other individual ones of said apparatus within radio frequency visibility of said probe.

3. The wireless communication control apparatus according to claim 2, wherein said means for transforming discovered open radio frequency spectra within the given spectra range into a plurality of wireless communication links between the control apparatus disposed randomly at individual locations further includes:
    means for establishing a local catalog of available frequencies and confirmation identifications from each apparatus within radio frequency visibility;
    means for using the established rules to select links extending between various ones of said plurality of apparatus; and
    means for updating said catalog information to adaptively and dynamically select appropriate links between various ones of said plurality of apparatus for wireless communication purposes.

4. The wireless communication control apparatus according to claim 2, further comprising:
  means for establishing a channel catalog database;
  means for using said channel catalog database to establish rules for each local apparatus relative to each other apparatus within radio frequency visibility, said rules being indicative of the fitness and robustness of each local apparatus to participate in a wireless network; and
  means for exchanging established rules so each apparatus is characterized as to its availability to other apparatus and to what extent a connection can be made between said plurality of apparatus.

5. A wireless communication control apparatus comprising:
  a circuit arrangement for dynamically and adaptively establishing a communication channel in an undefined radio frequency environment with other individual ones of wireless communication control apparatus within radio frequency visibility to facilitate forming a defined wireless network with at least one other wireless communication control apparatus in the undefined radio frequency environment;
  wherein said circuit arrangement includes:
  an analytical circuit for determining available wireless communication channels locally and remotely in said undefined radio frequency environment;
  a communication circuit for sending a probe to a remote wireless communication control apparatus location in response to said analytical circuit determining the availability of a communication channel in said undefined radio frequency environment; and
  another communication circuit for receiving a confirmation message from said remote wireless communication apparatus location to verify the establishment of a viable communication path in said undefined radio frequency environment;
  wherein said analytical circuit includes:
  a radio frequency circuit for discovering open radio frequency spectra within a given spectra range;
  a linking circuit for transforming discovered open radio frequency spectra within the given spectra range into a plurality of wireless communication links between the control apparatus disposed randomly at individual locations; and
  wherein said linking circuit includes:
  an exchange circuit for performing an inter-node exchange between individual ones of said plurality of apparatus of their determined expected bit rate error for their local environment;
  a confirming circuit for using exchanged expected bit rate errors to confirm whether a communication path may be validly available between with at least one other wireless communication control apparatus in the undefined radio frequency environment; and
  a cataloging circuit for establishing a local catalog of available frequencies and confirmation identifications from each apparatus within radio frequency visibility; and
  wherein said exchange circuit includes:
  a chirping send circuit for facilitating sending wirelessly a frequency chirped channel probe to other individual ones of said apparatus within radio frequency visibility of said probe; and
  a chirping receive circuit for facilitating receiving wirelessly a frequency chirped channel probe transmitted from other individual ones of said apparatus within radio frequency visibility of said probe.

6. The wireless communication control apparatus according to claim 5, wherein said radio frequency circuit includes:
  a foraging circuit for enabling local spectrum foraging.

7. The wireless communication control apparatus according to claim 6, wherein said forging circuit includes:
  an averaging circuit for calculating an average local noise level;
  a signal to noise circuit for using said average local noise level to determine a signal to noise ratio;
  a bit rate error circuit for using said signal to noise ratio for determining an expected bit rate error for the local environment of the wireless apparatus; and
  a propagation transit time circuit for determining an radio frequency wave transit time between nodes.

8. A wireless communication control apparatus, comprising:
  a circuit arrangement for dynamically and adaptively establishing a communication channel in an undefined radio frequency environment with other individual ones of wireless communication control apparatus within radio frequency visibility to facilitate forming a defined wireless network with at least one other wireless communication control apparatus in the undefined radio frequency environment;
  a database circuit for establish in a channel catalog database;
  a rules based circuit for using a channel catalog database to establish rules for each local apparatus relative to each other apparatus within radio frequency visibility, said rules being indicative of the fitness and robustness of each local apparatus to participate in a network;
  an exchange circuit for exchanging established rules so each apparatus is characterized as to its availability to other apparatus and to what extent a connection can be made between said plurality of apparatus; and
  a link selection circuit for using the established rules to select links extending between various ones of said plurality of apparatus.

9. The wireless communication control apparatus according to claim 8, further comprising:
  an updating circuit for updating said catalog information to adaptively and dynamically select appropriate links between various ones of said plurality of apparatus for wireless communication purposes.

10. A wireless communication system control apparatus according to claim 8, wherein at least one of the other wireless communication control apparatus communicates with another communication control apparatus for estabiishing desired communication paths therebetween.

11. A wireless communication system control apparatus according to claim 10, wherein said at least one of the other wireless communication control apparatus includes means for determining available wireless communication channels in at least one of the remote locations.

12. A wireless communication system control apparatus according to claim 11, wherein said at least one of the other wireless communication control apparatus includes means for determining possible communication device links.

13. A wireless communication system control apparatus according to claim 12, wherein said at least one of the other wireless communication control apparatus includes means for creating and storing a link catalog.

14. A wireless communication system control apparatus according to claim 13, wherein said at least another communication system controlling apparatus includes means for establishing rules for each link.

15. A wireless communication system control apparatus according to claim 14, wherein said at least one of the other wireless communication control apparatus includes means for establishing a desired route.

16. A wireless communication control apparatus comprising:
- a circuit arrangement for dynamically and adaptively establishing a communication channel in an undefined radio frequency environment with other individual ones of wireless communication control apparatus within radio frequency visibility to facilitate forming a defined wireless network with at least one other wireless communication control apparatus in the undefined radio frequency environment:
- wherein said circuit arrangement includes:
- a circuit for discovering how to coexist within a set of spectral and volumetric boundaries in an undefined radio frequency environment; and
- another circuit for sharing an arbitrary radio frequency spectrum with a plurality of radio frequency communication nodes disposed in said undefined radio frequency environment by sending, exchanging, and propagating channel information catalogs among said plurality of radio frequency communication nodes;
- wherein each individual one of said plurality of radio frequency communication nodes within radio frequency visibility of at least one other individual one of said plurality of radio frequency communication nodes form a defined wireless communication network; and
- wherein each individual one of said plurality of radio frequency communication nodes in said defined wireless communication network is characterized as to its availability to other individual ones of the radio frequency communication nodes and to what extent a communication channel connection can be made between said plurality of radio frequency communication nodes in said defined wireless communication network.

17. The wireless communication control apparatus according to claim 16, wherein said circuit for discovering how to coexist within a set of spectral and volumetric boundaries in an undefined radio frequency environment discovers and channelizes spectrum according to the capacity of the wireless communication control apparatus to support different modulations and data rates.

18. The wireless communication control apparatus according to claim 17, wherein said circuit for discovering how to coexist within a set of spectral and volumetric boundaries in an undefined radio frequency environment discovers and channelizes spectrum by analyzing and categorizing noise in a multidimensional manner to enable said plurality of radio frequency communication nodes in said defined wireless communication network to coexist using common or different frequencies or bandwidths in said undefined radio frequency environment.

* * * * *